US007035816B2

(12) United States Patent
Jankelewitz

(10) Patent No.: US 7,035,816 B2
(45) Date of Patent: Apr. 25, 2006

(54) SYSTEM AND METHOD FOR REDUCED COST PURCHASING

(76) Inventor: Elie Jankelewitz, 15 Osborne Ave. Jesmond, Newcastle Upon Tyne (GB) NE2 1JQ ( * ) Notice: Subject to any disclaimer, the term of this patent is extended or adjusted under 35 U.S.C. 154(b) by 0 days.

(21) Appl. No.: 10/123,002

(22) Filed: Apr. 12, 2002

(65) Prior Publication Data

US 2003/0023507 A1    Jan. 30, 2003

Related U.S. Application Data

(60) Provisional application No. 60/308,744, filed on Jul. 30, 2001.

(51) Int. Cl.
*G06F 17/60* (2006.01)
(52) U.S. Cl. .......................... 705/26; 705/27; 705/400
(58) Field of Classification Search ............ 705/26–27, 705/400
See application file for complete search history.

(56) References Cited

U.S. PATENT DOCUMENTS

| 4,992,940 | A | * | 2/1991 | Dworkin | 705/26 |
|---|---|---|---|---|---|
| 5,878,401 | A | * | 3/1999 | Joseph | 705/22 |
| 5,970,475 | A | * | 10/1999 | Barnes et al. | 705/27 |
| 6,134,548 | A | * | 10/2000 | Gottsman et al. | 707/5 |
| 6,912,507 | B1 | * | 6/2005 | Phillips et al. | 705/26 |
| 2002/0128920 | A1 | * | 9/2002 | Chopra | 705/26 |
| 2002/0174076 | A1 | * | 11/2002 | Bertani | 705/400 |

OTHER PUBLICATIONS

Laurent, "E-invasion," Government Executive, Jun. 2000, v32n6p26-34, Proquest issn #00172626.*

Business Wire, "General Services Administration Selects Frictionless Commerce For Government-wide e-Procuremet Pilot," Jun. 27, 2000.*
Business Wire, "Frictionless Commerce Developms Next Generation B2B Solution To Help Net Markets Increase Transactions," Apr. 3, 2000.*
Acses: "Acses Comparison Shopping Cart Makes Comparison Shopping Online Easier Than Ever," Business Wire, Nov. 17, 1998, Proquest #36029338.*
Acses: "Comparison Book Shopper Acses Expands Into Music And Movies," Business Wire, Mar. 8, 1999, Proquest #39545544.*
Acses: Internet Archive Wayback Machine, http://web.archive.org/web/*/http://www.acses.com, Dec. 2, 1998 (pp. 1-8), Dec. 6, 1998 (pp. 11-14), Feb. 24, 1999 (pp. 9-10).*
Acses: Kelley, Tina, "Connected Software Robots Can Help Find Best Buys," The Patriot Ledge, Oct. 19, 1998, Proquest #35288286.*
Item UU: Acses: "Online Shopping Just Got Easier: Dealpilot.com Unveils Browser Companion Toolbar To Deliver One-click Comparison Shopping For Books, Music, and Movies," Business Wire, Nov. 15, 1999, Proquest #46354481.*
Item V V: Barnesandnoble.com: Internet Archive Wayback Machine, http:/web.archive.org/web/*/http://www.barnesandnoble.com, Jun. 20, 2000 (pp. 1-11).*

(Continued)

*Primary Examiner*—Robert M. Pond
(74) *Attorney, Agent, or Firm*—Ostrolenk, Faber, Gerb & Soffen, LLP

(57) ABSTRACT

A system and method which enables a customer, for example a business or individual, to purchase one or more goods/services from one of a plurality of suppliers offering the one or more goods/services at the lowest aggregate price.

44 Claims, 16 Drawing Sheets

OTHER PUBLICATIONS

Item W W: Corporate Purchasing Systems: Ulfelder, Steve, "Undercover Agents," Computerworld, Jun. 5, 2000, Proquest #54817718.*

Item: X X: Corporate Purchasing Systems: "Motorola SSTG Pilot OBI With Office Depot," Electronic Commerce News, Sep. 15, 1997, Proquest #14374163.*

Barnesandnoble.com: Internet Archive Wayback Machine; www.archive.org; www.barnesandnoble.com; Feb. 8, 2000; 3pgs, http://web.archive.org/web/20000208030217/www.barnesandnoble.com/bin/index.asp.*

Exhibit: Dembart, Lee; "For Books, It Pays to Surf Around," International Herald Tribune, Jul. 8, 1999, 3pgs, Proquest #42999759.*

* cited by examiner

FIG.6A

TEST CUSTOMER
January 25, 2002

| Purchasing | My Account | Suppliers | About Us | Reports | Help | Logout | bestprice
purchase.com

46

Select from the following ▶ ○Categories ○History ○Favourites ⓘ  [ ] (Search) Your PO is blank ⓘ

Book and Pad                                                      (Back) (Hide)        Purchase Order          (Back) (Hide)

All Categories ⊙ Office Products                                                        Qty    Title                    0 item ⊙ Accounts Books            ⊙ Memo Pads
⊙ Address Books             ⊙ Refill Pads
⊙ Analysis Pads/Paper       ⊙ Repositional Notes                                        Your Purchase Order is currently
⊙ Books & Pads. Other       ⊙ Signature Books                                           empty.
⊙ Business Card Books       ⊙ Specialist Books
⊙ Drawing Pads              ⊙ Spiral Note Books                      47                                  48
⊙ Duplicate Books           ⊙ Visitors Books
⊙ Manuscript Books

TEST CUSTOMER
January 25, 2002 bestpricepurchase.com

| Purchasing | My Account | Suppliers | Reports | About Us | Help | Logout |

Select from the following ▼   ○ Categories ○ History ○ Favourites ⑦ ☐   (Search) Lowest Total £19.53 Item 1 ⑦

Manuscript Books
49

All Categories ⊙ Office Products ⊙ Books and Pads       (Back) (Hide)   Purchase Order                    (Hide)

| Product | Favourites | Qty | | Cost Centres | Price Band |
|---|---|---|---|---|---|
| OWN BRAND INDEX BOOK A5 | ⊕ | 1 | BUY | ☐ | £0.75–£1.00 |
| OWN BRAND INDEX BOOK A6 | ⊕ | 1 | BUY | ☐ | £0.53–£0.75 |
| OWN BRAND MANUSCRIPT BOOK A4 FEINT 01060/31005 | ⊕ | 450 | BUY | ☑ | £0.85–£1.40 |
| OWN BRAND MANUSCRIPT BOOK A5 FEINT 01061/31006 | ⊕ | 1 | BUY | ☐ | £0.53–£0.85 |
| OWN BRAND MANUSCRIPT BOOK A6 FEINT 01062/31007 | ⊕ | 1 | BUY | ☐ | £0.29–£0.52 |
| SELECT MANUSCRIPT A4 FEINT MARGIN 14400 | ⊕ | 1 | BUY | ☐ | £1.76–£3.97 |

50                                                                 52

| Qty | Title |
|---|---|
| 9 | ACCOUNT PAD A4 8COLUMN VESTRY CV2064 |

48

Now displaying results 0–55 of 55

(Clear Order)        (Complete Order)

TEST CUSTOMER
April 8, 2002

| Purchasing | My Account | Suppliers | Reports | About Us | Help | Logout | bestprice
purchase.com

Select from the following ▼

○ Categories  ○ History  ○ Favourites ⓘ

History

View by [PO Number ▼]    [    ] Search ⓘ    Your PO is blank    (Back) (View PO)

| PO No. | BPP No. | Date | Purchaser | Trade Area | Supplier | No. Items | Delivery | Total Amount |
|---|---|---|---|---|---|---|---|---|
| 211101 | 20 | 21-11-2001 | mandy@mandy.com | Office Products | Universal Office Equipment (UK) Ltd | 1 | £0.00 | £0.92 |
| mm | 7 | 04-10-2001 | mandy@mandy.com | Office Products | Corporate Express (UK) Ltd | 2 | £0.00 | £14.80 |
| TEST ORDER | 74 | 28-02-2002 | mandy@mandy.com | Office Products | Cooper Office Supplies Ltd | 5 | £0.00 | £113.64 |
| TEST ORDER | 75 | 01-03-2002 | mandy@mandy.com | Office Products | Office Friendly Dealer Association Ltd | 5 | £0.00 | £107.54 |
| TEST ORDER!!! | 123 | 08-04-2002 | mandy@mandy.com | Office Products | Jays Office Supplies Ltd | 3 | £0.00 | £221.36 |
| TESTING TESTING | 96 | 05-03-2002 | mandy@mandy.com | Office Products | Office Friendly Dealer Association Ltd | 1 | £6.00 | £28.70 |
| THIS IS A TEST ORDER | 79 | 04-03-2002 | mandy@mandy.com | Office Products | Office Friendly Dealer Association Ltd | 3 | £6.00 | £26.45 |
| TEST IS ANOTHER TEST ORDER | 80 | 04-03-2002 | mandy@mandy.com | Office Products | Office Friendly Dealer Association Ltd | 2 | £6.00 | £26.48 |

FIG.13

SYSTEM AND METHOD FOR REDUCED COST PURCHASING

CROSS REFERENCE TO RELATED APPLICATIONS

This application is based upon and claims priority to U.S. provisional patent application Ser. No. 60/308,744, filed Jul. 30, 2001, entitled SYSTEM AND METHOD FOR REDUCED COST PURCHASING, the entirety of which is incorporated herein by reference.

FIELD OF THE INVENTION

The present invention relates to a system and method for reducing the cost of purchasing goods and services. More particularly, the present invention relates to a system and method which enables a customer, for example a business or individual, to purchase two or more goods/services from one of a plurality of suppliers offering the two or more goods/services at the lowest aggregate price.

BACKGROUND OF THE INVENTION

Virtually every sector of society bears significant overhead costs. Procuring supplies and services (for example printing, stationary, telecommunications, insurance, cleaning, courier, air travel and information system supplies and services) is fundamental for any industry to survive.

Managing overhead costs, including locating the lowest prices for services and goods, remains a difficult, time-consuming and expensive challenge. As more types of goods and/or services are introduced into the marketplace, the amount of time required for procurement thereof increases. Currently, automated systems for procuring items are available. No system, however, currently exists that locates the lowest aggregate purchase price for at least two goods and/or services.

Parties that procure goods and services must rely upon suppliers to deliver goods and services affordably and promptly. If, for example, after placing an order a customer discovers that a supplier cannot deliver, the customer must locate another supplier that is able to provide the good/service, and preferably at a competitive price.

Suppliers of goods and services also face difficult challenges. Suppliers constantly strive to obtain new customers and retain existing ones. Moreover, suppliers typically realize slow responses to their marketing strategies, such as circulating promotional materials or requesting feedback from their customers. Marketing costs are typically very high (e.g., providing promotion materials, telemarketing and sales), and suppliers are forced to spend considerable resources in order to publicize their business. Suppliers continually struggle to expand their customer base, reduce their selling costs, increase their sales volume and ultimately increase their profit margins.

Other costs incurred by suppliers include inventory-related expenses (e.g., the cost of procuring inventory and maintaining inventory control), sales and service, employee management and the like. Therefore, both suppliers and customers desire to reduce operational costs while maximizing their profit margins.

SUMMARY OF THE INVENTION

There is a need for a system and method to enable customers and suppliers to reduce the costs associated with goods and services procurement in order to maximize their respective profit margins.

There is further a need for customers to select, from a plurality of suppliers, the price of a total order of goods and services. In this way, customers can compare suppliers' prices for an aggregate order.

The present invention ensures savings and profits for customers and suppliers by improving the process of goods and services procurement. The present invention preferably provides a one stop, global business to business on-line purchasing mechanism. Customers, particularly commercial businesses, are provided access to goods and services offered by a plurality of suppliers at competitive prices. The present invention further increases a supplier's customer base by providing exposure to an ever-growing marketplace. By automating and integrating a plurality of external and internal supply processes throughout the goods and services supply chain, the present invention provides solutions to procurement challenges for both customers and suppliers.

In a preferred embodiment, the present invention comprises an input/output module, a price optimization module and one or more supplier database modules. The input/output module preferably accepts input from a user and transmits information in response to the user's input. The price optimization module preferably accumulates information regarding a customer's purchases and displays pricing information directed to the aggregate price of an order. The supplier databases preferably contain pricing and other information relating to goods and services offered by suppliers. Other software modules are preferably included for assisting with order entry, financing a customer's purchases, processing payments for goods and services, tracking orders while on route, and for providing detailed reports.

In operation, a customer, via the plurality of software modules, submits an order form that lists two or more goods and/or services that the customer is interested in purchasing. The price optimization module of the present invention accesses data that are stored in one or more supplier's databases and retrieves information directed to the goods and services the customer seeks to procure. For example, the price optimization module retrieves prices of the two or more goods and/or services identified in the order form. From this retrieved information, the price optimization module evaluates each supplier's offering price for the requested goods and/or services, and lists the aggregate purchase prices therefor, preferably ordered from lowest price to highest price for each supplier.

With this information, the customer may select the lowest aggregate price for the goods/services offered by one of the suppliers listed, and place the order for the goods/services. Therefore, by clearly identifying each supplier's price for the total order, the present invention preferably affords customers the ability to reduce their costs and improve their efficiency by paying the lowest price.

The present invention also affords suppliers access to a large customer base. Suppliers preferably submit information regarding their goods and services, and the submitted information is stored in one or more supplier databases. By providing information regarding their inventory levels, the present invention preferably notifies both customers and suppliers when inventory levels are not within optimum capacity. Suppliers use the present invention to manage online order processing and purchasing, and further to distribute promotion information in order to improve profit margins. In this way, suppliers remain competitive in the marketplace.

Furthermore, the present invention provides an online consulting service. For example, an online consultant interacts with a customer in order to provided advice regarding special purchases. For example, the on-line consultant helps introduce a customer to one or more suppliers.

BRIEF DESCRIPTION OF THE DRAWINGS

For the purposes of illustrating the invention, there is shown in the drawings a form which is presently preferred, it being understood however, that the invention is not limited to the precise arrangements and instrumentalities shown. The features and advantages of the present invention will become apparent from the following description of the invention that refers to the accompanying drawings, in which:

FIG. 6A shows a sample select category order screen in accordance with the principles of the present invention;

FIG. 6B shows a sample select sub-categories display screen in accordance with the principles of the present invention;

FIG. 7A illustrates a select sellables display screen used for ordering specific sellables and showing a image/description screen embedded therein, in accordance with the present invention;

FIG. 7B illustrates another select sellables display screen used for ordering specific sellables in accordance with the present invention;

FIG. 8 shows a customer cost center display screen is accordance with the principles of the present invention;

FIG. 9 depicts a summary purchase session screen identifying the details of a current purchase order in accordance with the principles of the present invention;

FIG. 10 illustrates order review display screen identifying the details of a purchase order;

FIG. 13 identifies an order history display screen in accordance with the principles of the present invention.

DETAILED DESCRIPTION OF EMBODIMENTS OF THE INVENTION

Figure 1:
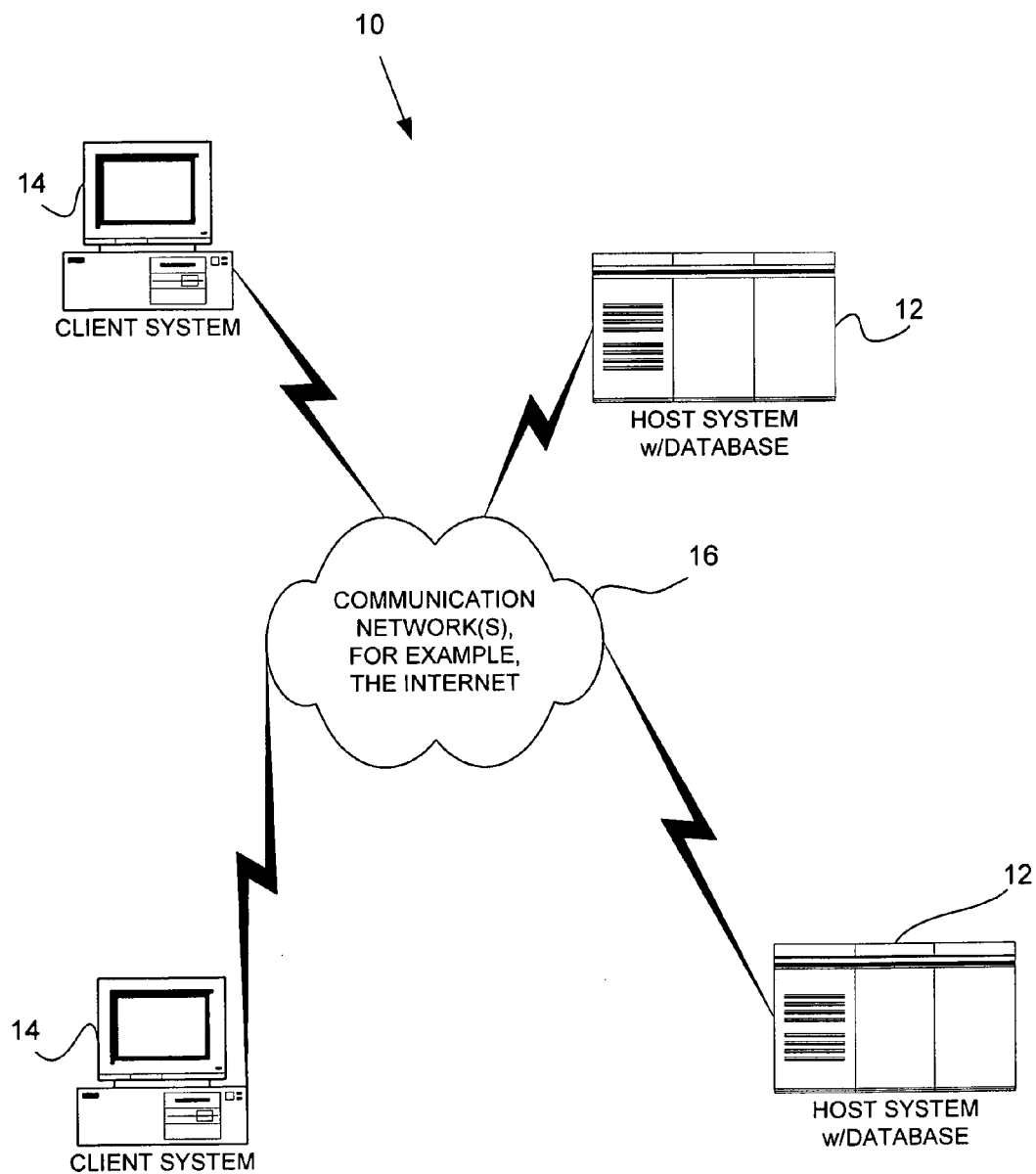
FIG. 1 illustrates a hardware arrangement for a preferred embodiment of the present invention.

Referring now to the drawing figures, in which like reference designators refer to like elements, there is shown in FIG. 1 an example of a first preferred embodiment of the present invention for reducing the cost of purchasing and generally referred to as the "automated purchase solutions system 10." In short, the automated purchase solutions system 10 preferably receives requests for goods and/or services from customers, and lists the prices for the aggregate order that are offered by two or more suppliers. The present invention provides solutions to procurement challenges for both customers and suppliers.

As used herein, the term "sellables" includes goods and/or services that are offered for sale by one or more suppliers. Sellables include anything that can be offered for sale via the present invention, for example, telecommunications, insurance, couriers, travel, computer hardware and software. Also as used herein, the term "aggregate price" refers to a combination of prices for all sellables requested by one customer.

As referred to herein, a "user" of the automated purchase solutions system 10 includes anyone who operates the system 10 to purchase sellables via the present invention. Such users are further referred to herein as "customers." Customers include businesses and individuals. Users further include those who operate the system 10 to supply sellables. Such users are further referred to herein as "suppliers."

Registered users of the automated procurement solutions system 10 are afforded authorization, for example, a user name and password enabling access to restricted portions of the automated procurement solutions system 10 in order to perform many of the tasks provided therein. As will be described in greater detail below, an automated procurement solutions system 10 provides varying levels of functionality for different categories of users. For example, a customer who is authorized as a staff customer is afforded rights to select sellables via the present invention and submit an order form for the selected sellables. A user registered as an administrative customer is afforded more rights over the staff customer, including, for example, canceling, modifying or placing the staff customer's order. By restricting access the system 10 to specific categories of users, companies involved in procuring sellables are assured that users will not incorrectly use, or even abuse, the system 10.

As used herein, the term "order session" refers to an active connection between a customer and the automated procurement solutions system 10 wherein the customer selects a plurality of sellables for procurement.

The automated procurement solutions system 10 preferably comprises at least one host system 12 and at least one user terminal 14, each of which is coupled to communication network 16. Host system 12 preferably includes all databases necessary to support the present invention. However, it is contemplated that host system 12 can access any required databases via communication network 16 or any other communication network to which host system 12 may be coupled. Communication network 16 is preferably a global public communication network such as the Internet, but can also be a wide area network (WAN), local area network (LAN), or other network that enables two or more computers to communicate.

In the first preferred embodiment, host system 12 and user terminal 14 are any devices that are capable of sending and receiving data across communication network 16, e.g., mainframe computers, mini computers, personal computers, laptop computers, personal digital assistants (PDA), cellular telephones, and Internet access devices such as Web TV. In addition, user terminals 14 are preferably equipped with a web browser, such as MICROSOFT INTERNET EXPLORER, NETSCAPE NAVIGATOR and the like. Host systems 12 and terminals 14 are coupled to communication network 16 using any known data communication networking technology.

Figure 2:
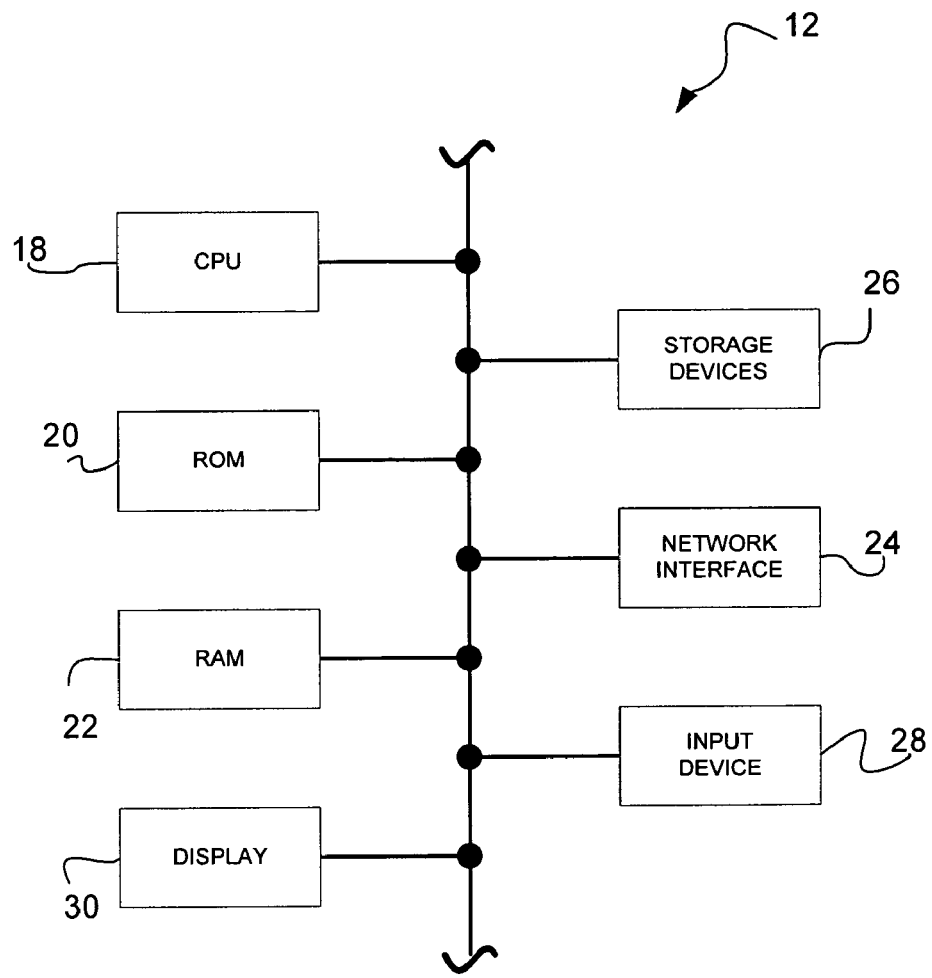
FIG. 2 is a block diagram of the functional elements constructed in accordance with the present invention.

As shown in FIGS. 1 and 2, the functional elements of each host system 12 include one or more central processing units (CPU) 18 used to execute software code and control the operation of host system 12, read-only memory (ROM) 20, random access memory (RAM) 22, one or more network interfaces 24 to transmit and receive data to and from other computing devices across a communication network, storage devices 26 such as a hard disk drive, floppy disk drive, tape drive, CD ROM or DVD or storing program code, databases and application data, one or more input devices 28 such as a keyboard, mouse, track ball, microphone and the like, and a display 30.

The various components of host system 12 need not be physically contained within the same chassis or even situated in a single location. For example, storage device 26 may be located at a site which is remote from the remaining elements of host systems 12, and may even be connected to CPU 18 across communication network 16 via network interface 24. Host systems 12 include a memory equipped with sufficient storage to provide the necessary databases, forums, and other community services as well as acting as a web server for communicating hypertext markup language (HTML), Java applets, Active-X control programs and the like to user terminals 14. Host systems 12 are arranged with components, for example those shown in FIG. 2, suitable for the expected operating environment of host system 12. The CPU(s) 18, network interface(s) 24 and memory and storage devices are selected to ensure that capacities are arranged to accommodate expected demand.

As used herein, the term "link" refers to a selectable connection from one or more words, pictures or other information objects to others in which the selectable connection as presented within the web browser. The information object can include sound and/or motion video. Selection is typically made by "clicking" on the link using an input device such as a mouse, track ball, touch screen and the like. Of course, one of ordinary skill in the art will appreciate that any method by which an object presented on the screen can be selected is sufficient.

The functional elements shown in FIG. 2 (designated by reference numerals 18–30) are the same categories of functional elements present in user terminals 14. However, not all elements need be present, for example, storage devices in the case of PDA's and the capacities of the various elements are arranged to accommodate the expected user demand. For example, CPU 18 in user terminal 14 may be a smaller capacity CPU than the CPU present in the host system 12. Similarly, it is likely that the host system 12 will include storage devices of a much higher capacity than storage devices present in user terminal 14.

Of course, one of ordinary skill in the art will understand that the capabilities of the functional elements can be adjusted as needed. The nature of the invention is such that one skilled in the art of writing computer executable code (software) can implement the described functions using one or more of a combination of popular computer programming languages and developing environments including, but not limited to C++, Visual Basic, Java, HTML and web application development applications.

Although the present invention is described by way of example herein, and in terms of a web-based system using web browsers and a web site server (i.e., host system 12), the automated procurement solutions system 10 is not limited to such a configuration. It is contemplated that the automated procurement solutions system 10 can be arranged such that user terminals 14 can communicate with and display data received from host systems 12 using any known communication and display method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on user terminal 14, for example, Windows 3.x, Windows 95, Windows 98, WINDOWS NT, WINDOWS 2000, WINDOWS ME, WINDOWS XP, WINDOWS CE, MAC OS, UNIX, LINUX, PALM OS and any suitable operating system.

As used herein, references to displaying data on user terminal 14 refer to the process of communicating data to the terminal across communication network 16 and processing the data such that the data is viewed on the terminal displays 30, for example by using a web browser and the like. As is common with web browsing software, the display screen on terminals 14 present sites within the networked system 10 such that a user can proceed from site to site within the system by selecting a desired link.

Further, references to displaying data on user terminal 14 regard the process of communicating data to the terminal across communication network 16 and processing the data such that the data can be viewed on the user terminals' displays 30 using web browsers and the like. The display screens on user terminals 14 present areas within the automated procurement solutions system 10 such that a user can proceed from area to area by selecting a desired link. Therefore, each user's experience is based on the order with which they progress through the display screens. Graphic controls are preferably available in the display screens to initiate data processes, and to provide convenient navigation therebetween. In other words, because the system is not completely hierarchical in its arrangement of display screens, users can proceed from area to area without the need to "backtrack" through a series of display screens. For that reason, and unless stated otherwise, the following discussion is not intended to represent any sequential operation steps, but rather to illustrate the components of the automated procurement solutions system 10.

Figure 3:
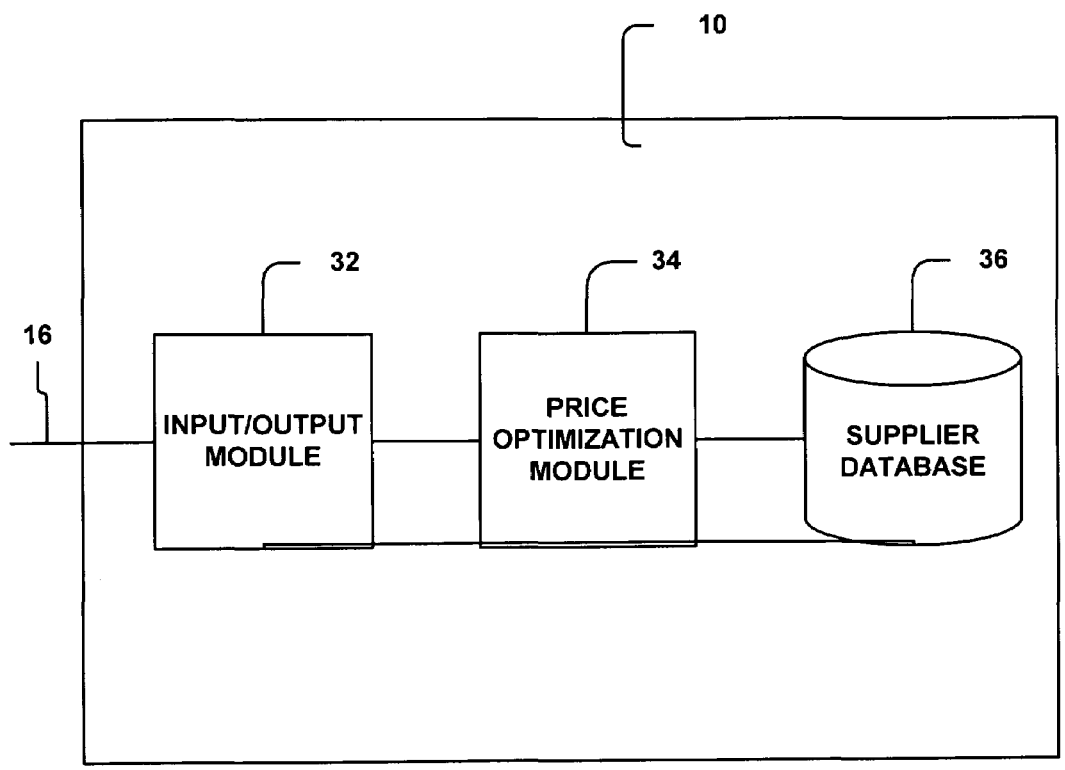
FIG. 3 shows a block diagram of three software modules in accordance with the present invention.

As shown in FIG. 3, the present invention preferably comprises a plurality of software modules that enable a user to interface with the system. For example, FIG. 3 illustrates an input/output module 32, a price optimization module 34 and one or more supplier databases 36. The supplier databases 36 preferably contain pricing and other information related to sellables offered by suppliers.

Figure 4A:
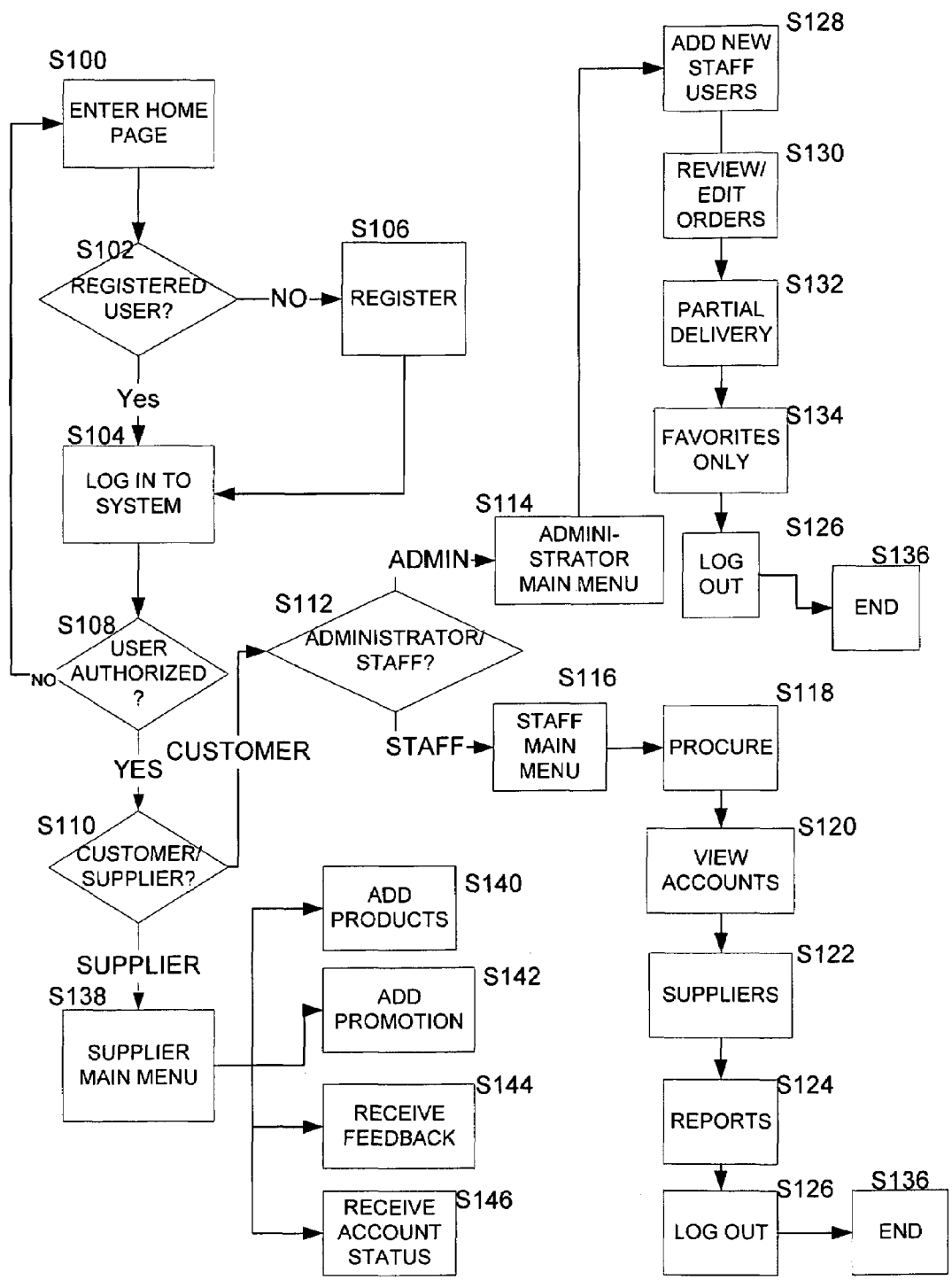
FIG. 4A is a flowchart showing the features of the present invention.

Referring now to the flowchart in FIG. 4A, a user preferably starts an on-line session with the automated procurement solutions system 10 by providing a URL in a web browser to display a "home page" web site maintained by the host system 12 (step S100). The home page is preferably not restricted to registered users. Certain information, for example, press releases, is preferably available to registered and non-registered users. Links that provide access to restricted areas of the automated procurement solutions system 10 are, however, preferably restricted to registered users.

Once a user selects a hyperlink reserved for registered users, the automated procurement solutions system 10 preferably determines whether the user is authorized to proceed (step S102). For example, a user is prompted to "log in" by supplying a unique user identification name and a password (step S104). In the preferred embodiment, the system 10 automatically authenticates registered users by referencing an identification object, for example a "cookie." If the user has not previously registered, then he or she is preferably presented with a registration display screen used for registering with the system (S106).

When a user registers with the automated procurement solutions system 10, for example, by submitting data in an electronic registration data entry form, he or she preferably defines the context in which he or she is authorized and intends to use the system. The automated procurement solutions system 10 functions in the context of the registered user. Users who register as suppliers are preferably presented with supplier-related functionality, while registered customers receive customer-related functionality.

When a new customer registers with the automated procurement system 10, information directed to the customer is preferably provided. For example, a customer affiliated with businesses submits the company's name, the type of organization the company is classified as, registration numbers, managing director's name, addresses, telephone numbers and the like. Moreover, information directed to the customer's industry, for example, service or manufacturing, the number of employees, annual purchasing, and the like is also submitted. Additionally, information directed to the user(s) who will operate the system 10, for example, the user's name, title, address, telephone and fax numbers, is preferably submitted. New customers also preferably submit information regarding delivery locations, invoices, and payments.

A new supplier who registers with the automated procurement solution system 10 also provides information directed to the supplier's business. For example, the supplier's company name, registration number, address, telephone number, and the like are provided. Contact information is preferably submitted by a new supplier including, for example, the contact's name, position, address and telephone and fax numbers. Moreover, the supplier preferably submits financial information, for example, credit limits for customers' orders, customer discounts, minimum order amounts, delivery charges, bank name, branch address, account names and account numbers. The automated procurement system 10 further preferably prompts users who register as suppliers to submit information directed to the sellables they offer, for example, prices, discounts, inventory stock levels and promotions.

In a preferred embodiment, suppliers are required to offer all sellables that are available via the automated procurement solution system 10 within a single category. For example, suppliers offering sellables within the category, office supplies, supply all listed office supplies available via the system 10. In this way, suppliers are competing fairly because no single supplier that specializes in a single type of item, for example, printer cartridges, is allowed to offer that item at the significantly discounted price as a result the supplier's specialization.

Continuing now with the flow chart shown in FIG. 4A, a user accesses the automated procurement solutions system 10 (i.e., by submitting his or her identification name and password), and the host system 12 thereafter makes a determination whether the user is registered with the system (step S108). If the host system 12 concludes that the person completing the form is not authorized to access restricted portions of the automated procurement solutions system 10, entry is denied and the user is presented with the home page as described in step S100.

After the host system 12 determines that the user is authorized, the host system 12 preferably determines whether the user is affiliated with a customer or a supplier (step S110). If the user is a customer, the system 10 preferably determines whether the user is a staff customer or administrative customer (step S112). Preferably, the automated procurement solutions system 10 presents main menu display screens that correspond with the user's registered status. For example, an administrative customer main menu display screen is preferably provided for administrative customers (step S114). Alternatively, user terminal 14 preferably presents a staff customer main menu display screen for staff customers (step S116).

The functionality afforded to customers via the automated procurement solutions system 10 is now further described.

As shown in the flow chart shown in FIG. 4A, users registered with automated procurement solutions system 10 as staff customers are provided choices for procuring sellables (step S118), viewing current account status (step S120), accessing supplier web sites (step S122), generating reports (step S124) and terminating the on-line session by logging out (steps S126 and S136). Additional functionality provided for staff customers include, for example, on-line consultant service-related functions, electronic file management and customer feedback (not shown).

The functionality afforded to administrative customers is preferably greater than that afforded to staff customers. For example, in step S128, administrative customers add or remove access for staff customers to the automated procurement solutions system 10. In a preferred embodiment, all functionality afforded to staff customers via the present invention is similarly provided to administrative customers. In step S130, the user reviews purchase orders that were submitted by staff members to ensure, for example, accuracy and compliance with customer guidelines. In step S132, the user defines preferred delivery schedules for orders a customer with staff rights placed at an earlier time. For example, a user, a customer with administrative rights, directs all orders for one of its departments, shipping, to be delivered overnight. Continuing with this example, the user elects to have orders placed for another department, graphics, to be delivered only after written authorization from the user is received. This permits, for example, one department that is efficient to receive its orders instantly, while restraining another, perhaps inefficient, department from receiving orders.

Other functionality afforded to customers includes favorites lists and favorites only lists. In a preferred embodiment, a favorites list of is generated by customers (both staff customers and administrative customers) during the process of selecting sellables. Favorites lists are also preferably generated from archived records from previous orders. Moreover, users who register with the automated procurement solutions system 10 as administrative customers can define a favorites-only restriction (step S134). Favorites-only lists restrict the choices of sellables that are available to customers to favorites list. Sellables that are included in favorites-only lists may be generated from for favorites lists, and can order be generated from any order history. By restricting purchasing to favorites-only lists, customers with staff privileges are unable to place orders for sellables not listed therein. This feature helps customers manage costs associated with procurement by restricting purchases of sellables to pre-approved lists.

Moreover, during the new user registration process, administrative customers can define a plurality of conditions for staff customers, for example, the time period when a purchase order can be placed, and when staff customers must defer to administrative members during procurement. For example, a manager of a customer company defines a one week period for any purchase order to be formally placed with a supplier. In this way, purchase orders can be consolidated and sent to suppliers at one time. Companies can accurately budget for their procurement requirements, and control costs associated therewith.

When an administrative customer desires to complete the on-line ordering session, (s)he preferably selects an option to log out of the automated procurement solutions system 10 (step S126) and terminate the session (step S136). The functions provided by the automated procurement solutions system 10 for suppliers are now described.

When the host system 12 determines that the registered user is a supplier of sellables, a supplier main menu is preferably displayed (step S138). The list of functions available to suppliers preferably includes the ability to add new sellables for sale (step S140), add promotional information (step S142), receive feed-back from customers (step S144) and review account status (step S146). Other functionality preferably available to suppliers includes order tracking, price modifying, data importing, report viewing, system log viewing and audit trail reviewing (not shown).

Figure 4B:
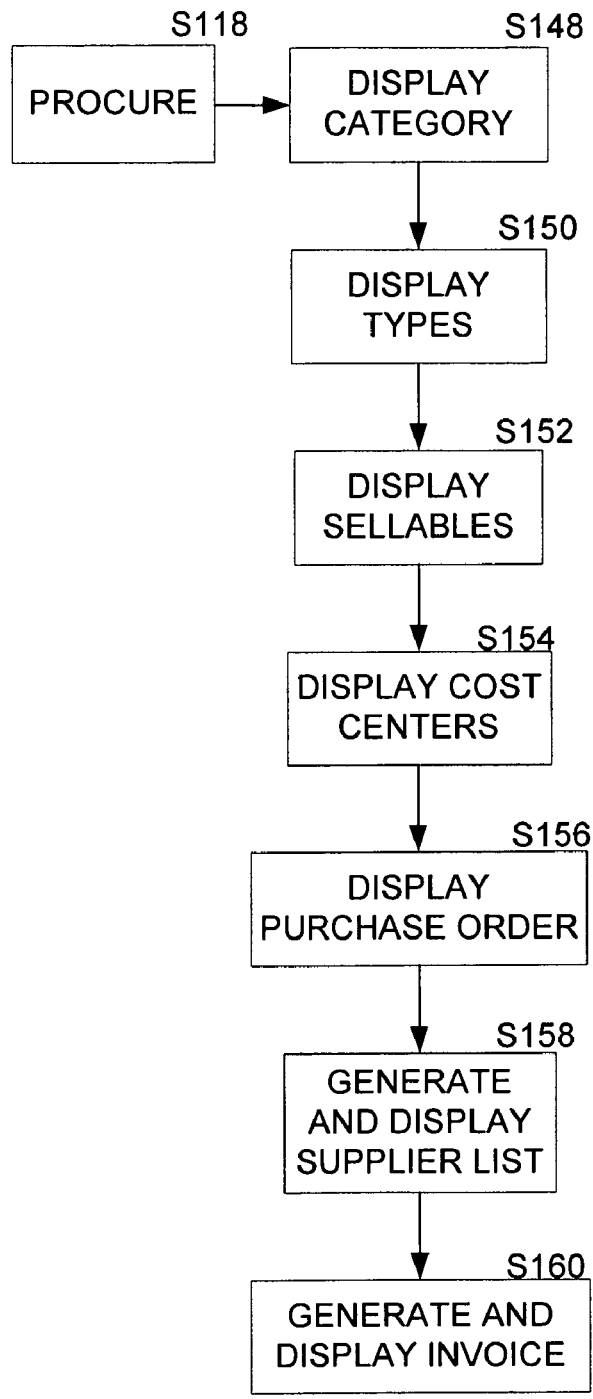
FIG. 4B is a flowchart detailing the process of procuring sellables via the present invention.

FIG. 4B is a flowchart identifying in greater detail the steps involved in procurement of sellables (step S118) via the present invention. In step S148, the system displays selections for a desired category of sellables, for example, computer consumables and office supplies. In step S150, the system 10 displays a selection for a desired sub-category of sellable within the selected category of sellables, for example ink jet printer cartridges. In step S152, the system 10 displays a selection of the particular desired sellable, for example, ABC brand, model 1234, and also the desired quantity.

In step S154, the system 10 enables the user to define the a plurality of departments for receiving the selected sellable(s). The automated procurement system 10 preferably allows users to define and identify a plurality of departments and/or locations (referred to herein as "cost centers") where sellables are to be delivered. Customers with administrative access rights preferably define which cost centers are to receive sellables procured by the present invention, and further the degree to which each cost center is responsible for payment therefor. Multiple cost center support is described in greater detail below with reference to FIG. 8.

When the user has completed selecting the sellables that (s)he desires, the automated procurement solutions system 10 preferably generates and displays the current purchase order for the user's review (step S156). In step S158, the sytem 10 generates and displays a supplier list, and identifies the price for the aggregate order for each of a plurality of suppliers (step S158). The customer preferably selects one of the suppliers providing the sellables and the automated procurement solutions system 10 preferably generates an invoice therefor (step S160). In a preferred embodiment, the supplier is paid for the sellables via a method for electronic payment.

Figure 5:
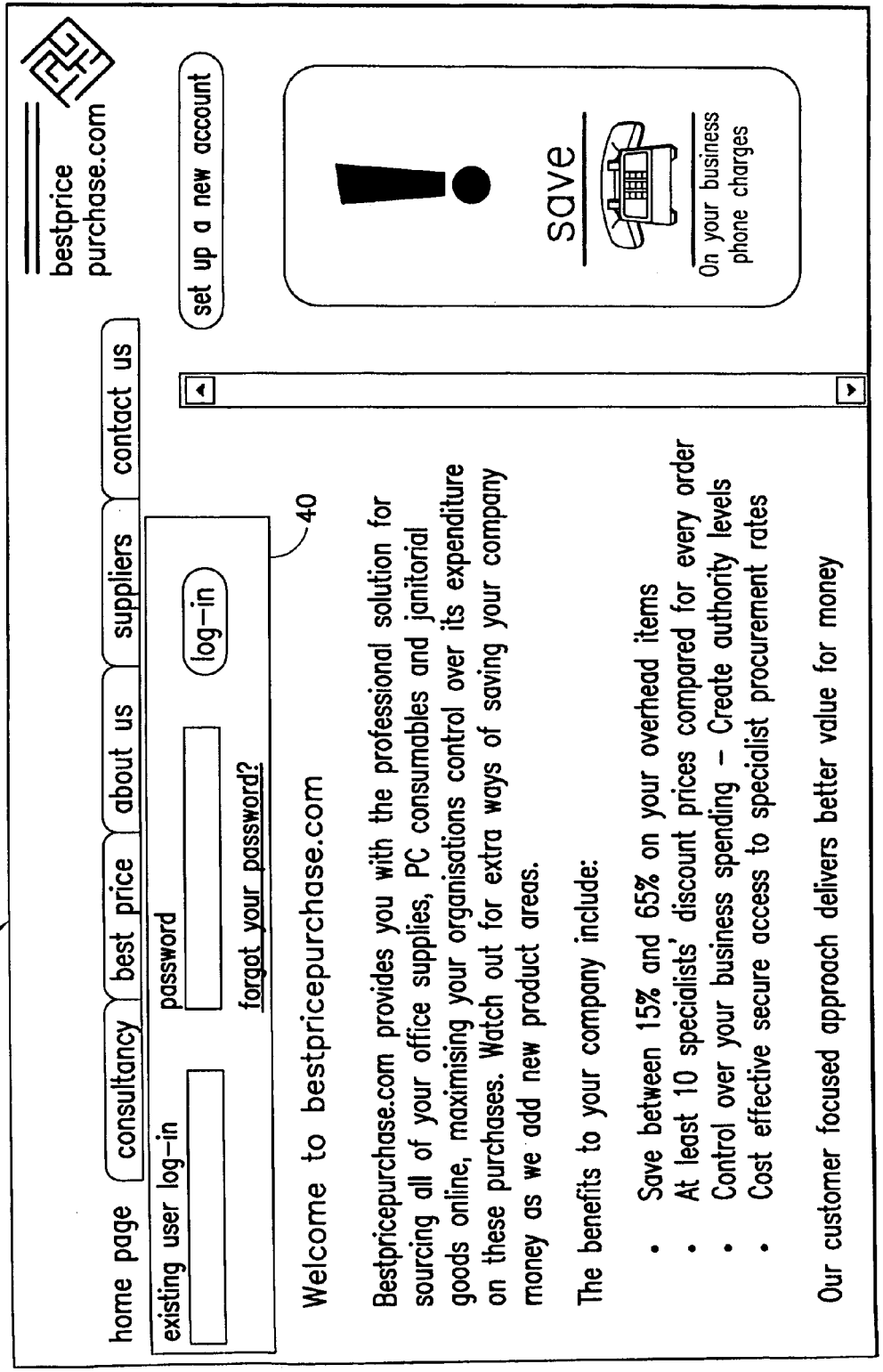
FIG. 5 depicts an example home page of a preferred embodiment of the present invention.

FIG. 5 shows an example home page 38 in a preferred embodiment of the automated procurement solutions systems 10. After a user enters a corresponding URL for the present invention, for example in a web browser application, a display screen substantially as shown in FIG. 5 is provided. For example, log in section 40 of home page 38 enables a user to submit a user name and password in order to access restricted areas of the system 10. In the event that the user has not yet registered, then he or she preferably selects a link to set up a new account, and thereby register to gain access to the restricted portions of the automated procurement solutions system 10.

When a customer elects to procure sellables via the present invention, he or she preferably starts an order session. In a preferred embodiment, a user saves an order created during an order session for use as a template on which to base future orders. Whole or partial orders can preferably be based upon a template.

Figure 6A:
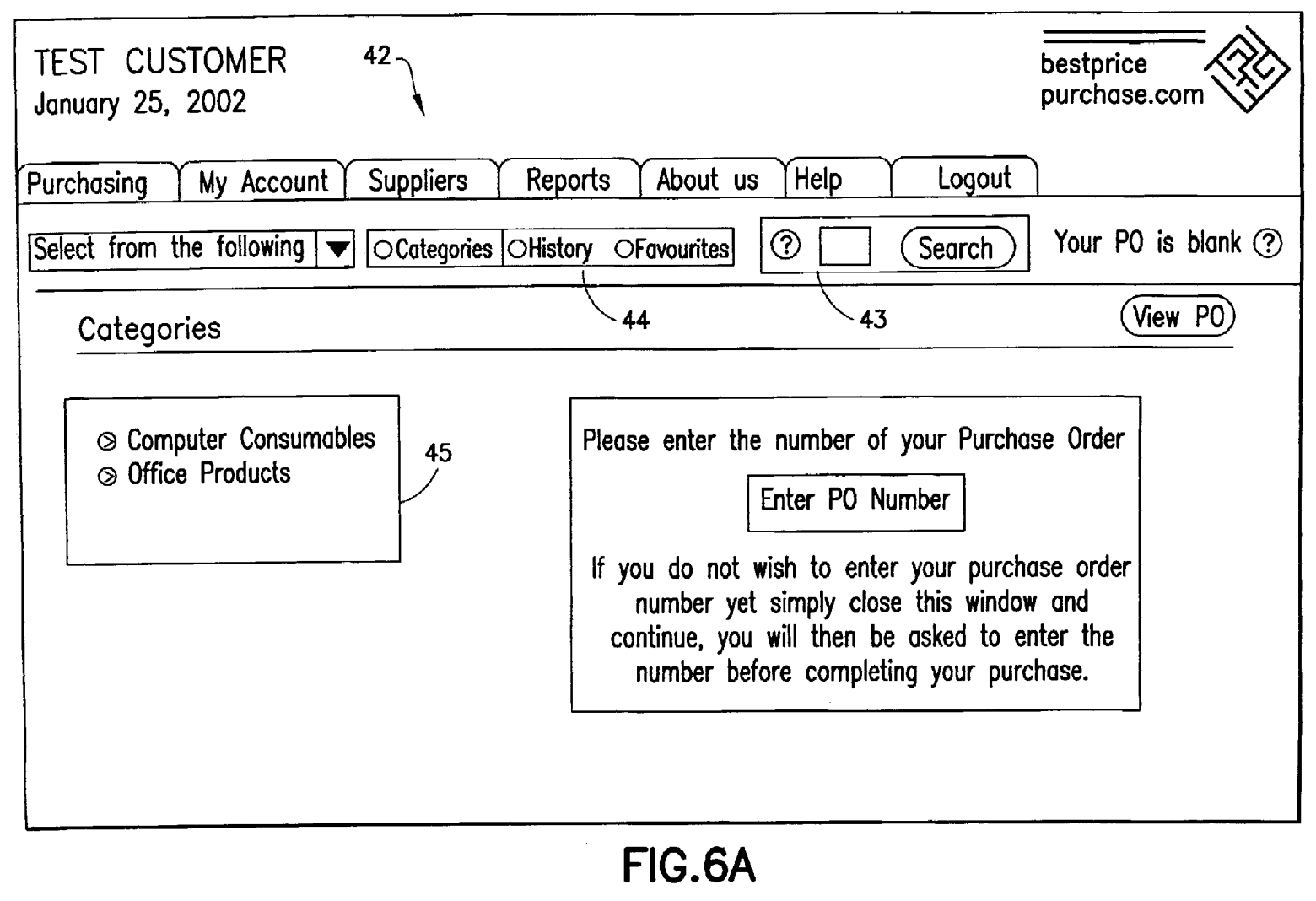

FIG. 6A shows a sample category order screen 42 provided to a customer who elects to make a purchase using the present invention (step S112, FIG. 4A). The order screen 42 includes a search textbox control 43 that is used to locate sellables quickly. For example, a user looking for ¾ inch nails types the value "¾ inch nails" in the search textbox control 43 to quickly locate suppliers offering the nails. In a preferred embodiment, a search form display screen is automatically presented to the user when a sellable entered in the search textbox control 43 cannot be located by the automated procurement solutions system 10. Moreover the automated procurement solutions system 10 preferably lists sellables that are similar in nature to the sellable entered in the search textbox control 43. In the above example, the user is provided with an alternative nail, ⅞ inch nails, to the desired ¾ inch nails. The feature of automatically providing a search form display screen and alternative sellables improves the likelihood that a desired sellable can be procured by a user via the present invention.

Also as shown in FIG. 6, template section 44 includes controls enabling users to base a future order upon a history of previous orders, or upon a favorites list. Also shown in FIG. 6, a category list 45 displays types of sellables that are available for procurement. Examples of categories shown in the category list 45 include computer consumables and office products. The customer preferably uses his or her pointing device (e.g., a mouse, track ball and the like) to select the category of sellables that the customer desires.

FIG. 6A shows a select sub-categories display screen 46 that is preferably presented after a user has selected a corresponding category from the category list 45 (FIG. 6). In the example shown in FIG. 6A, the user has previously selected Office Products from the category list 45, and is presented with fifteen sub-categories of office products available in sub-category list 47 via the present invention. It is contemplated herein that a plurality of categories and sub-categories are available for selecting sellables in accordance with the principles of the present invention. Also shown in FIG. 6A is a current status list 48 that identifies the sellables that have been previously selected by the user. In the example shown in FIG. 6A, no sellables are displayed in the current stats list 48 because the user has not yet selected any sellables to procure.

Figure 7A:
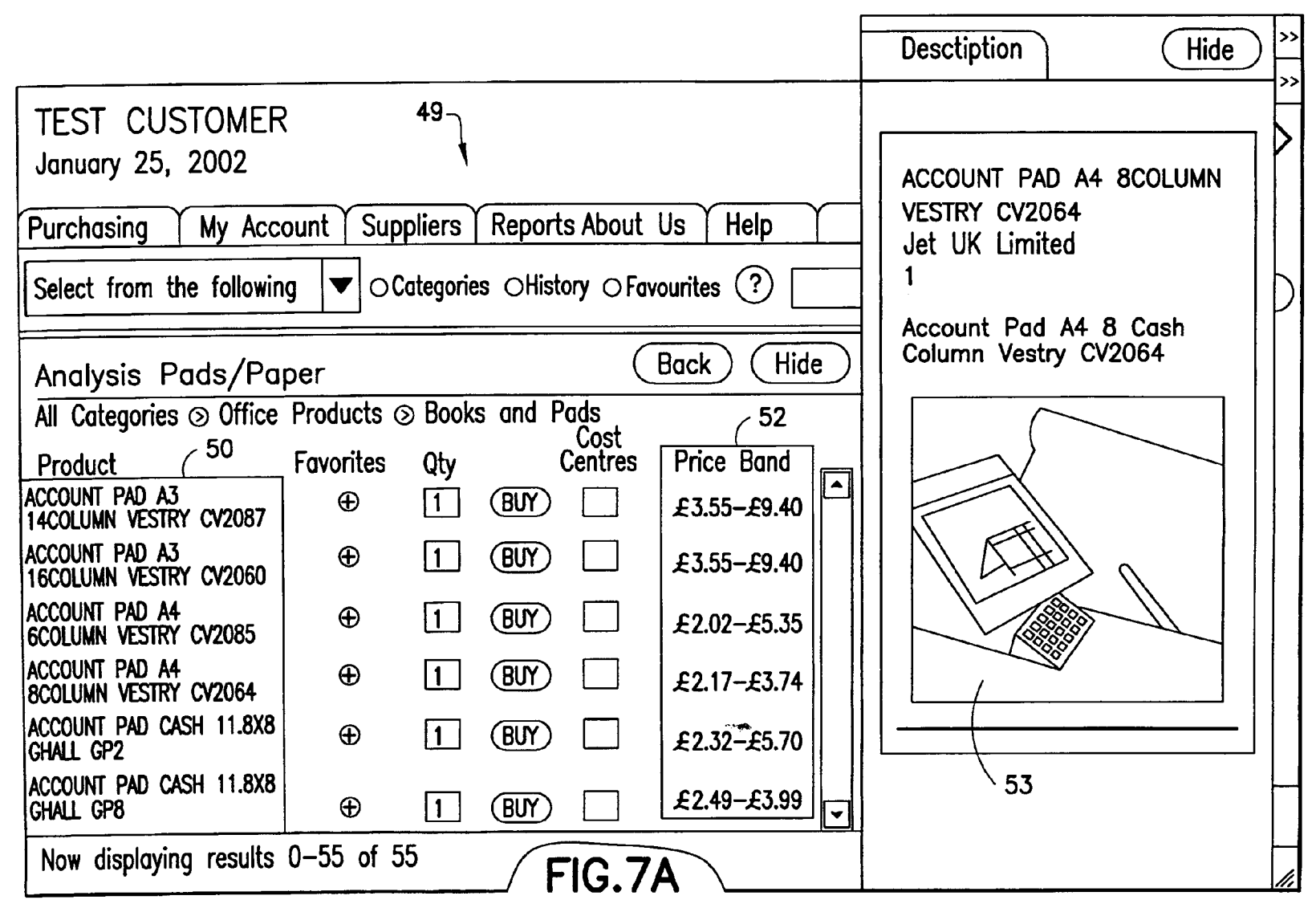

FIG. 7A illustrates an example select sellables screen 49 that is used for ordering sellables that correspond with the sub-category of sellables the customer previously selected (Books and Pads). Included in the select sellables screen 49 is a sellables list 50 that provides a brief description of the sellables available within the sub-category selected by the user in the select sub-category display screen 46. In a preferred embodiment, and shown in FIG. 7A, the descriptions of the sellables in the sellables list 50 are hyperlinks which, when selected, cause more information directed to the selected sellable to appear. In the example shown in FIG. 7A, the user selects the Account Pad A4–8 column Vestry in the sellables list 50, and an image corresponding to the account pad appears with descriptive text in the image/description display screen 53. Moreover, a price range list 52 is preferably provided that displays a range of prices offered for each sellable by a plurality of suppliers. The range of prices for the Account Pad A4-8 Column Vestry is between $2.17–$3.74.

FIG. 7B shows another select sellables display screen 49 that the customer has used to direct the automated procurement solutions system 10 to order sellables. As shown in the example in FIG. 7B, a current status list 48 is displayed showing the customer's current order status. During this stage of ordering, the automated procurement solutions system 10 preferably does not provide the customer with the specific price for the vestries offered by every supplier. Instead, the customer is provided with a range of prices showing the lowest offering price and the highest offering price for all of the respective suppliers within the category of sellables. When the customer is finished selecting sellables for the desired sub-category, in the example shown in FIG. 7B, Account Pad A4-8 Column Vestry, he or she is afforded an opportunity to select a link in the page to begin ordering sellables from a different sub-category, or complete the order.

Also shown in FIG. 7B, a list of checkboxes used to identify a one or more parties (i.e., cost centers) that will receive the sellables that the customer is purchasing. Of course, one skilled in the art will recognize that any graphic control or other feature enabling a user to define the one or more cost centers to receive the sellables is contemplated herein. The user preferably identifies departments or cost centers that will receive the sellables and, in a preferred embodiment, will reimburse the customer for costs associated with the procured sellables, by selecting corresponding check-boxes.

Figure 8:
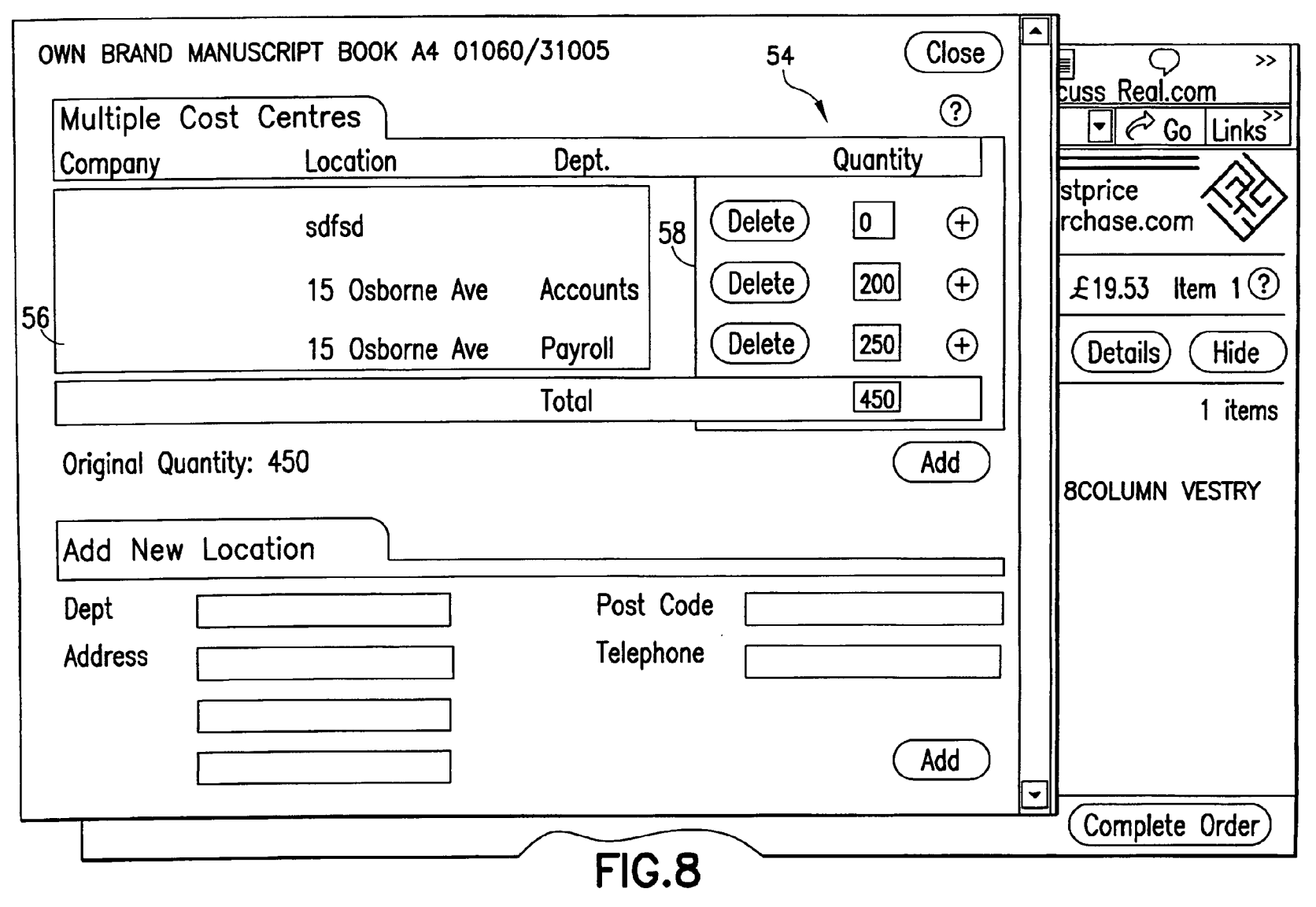

FIG. 8 shows a customer cost center screen 54 that illustrates the one or more cost centers that are to receive Own Brand Manuscript Books ordered by the customer. During the initial registration of a customer with the automated procurement solutions system 10, the user preferably submits a list of addresses where delivery of sellables, in addition to invoices, are to be delivered. Also shown in FIG. 8, a cost center location box 56 identifies the location of the cost center. Moreover, quantity data field 58 defines the number of sellables to be received by the cost center For example, the department, Accounts, is scheduled to receive 200 Manuscript Books, while the department, Payroll, will receive 250. Moreover, as shown in FIG. 8, a user is afforded an opportunity to add a new cost center by submitting information regarding the cost center, for example the name of the department, the physical location, the postal code and the telephone number, to the automated procurement solutions system 10. In a preferred embodiment, the automated procurement solutions system 10 validates postal codes and telephone numbers automatically prior to processing new cost centers.

Figure 9:
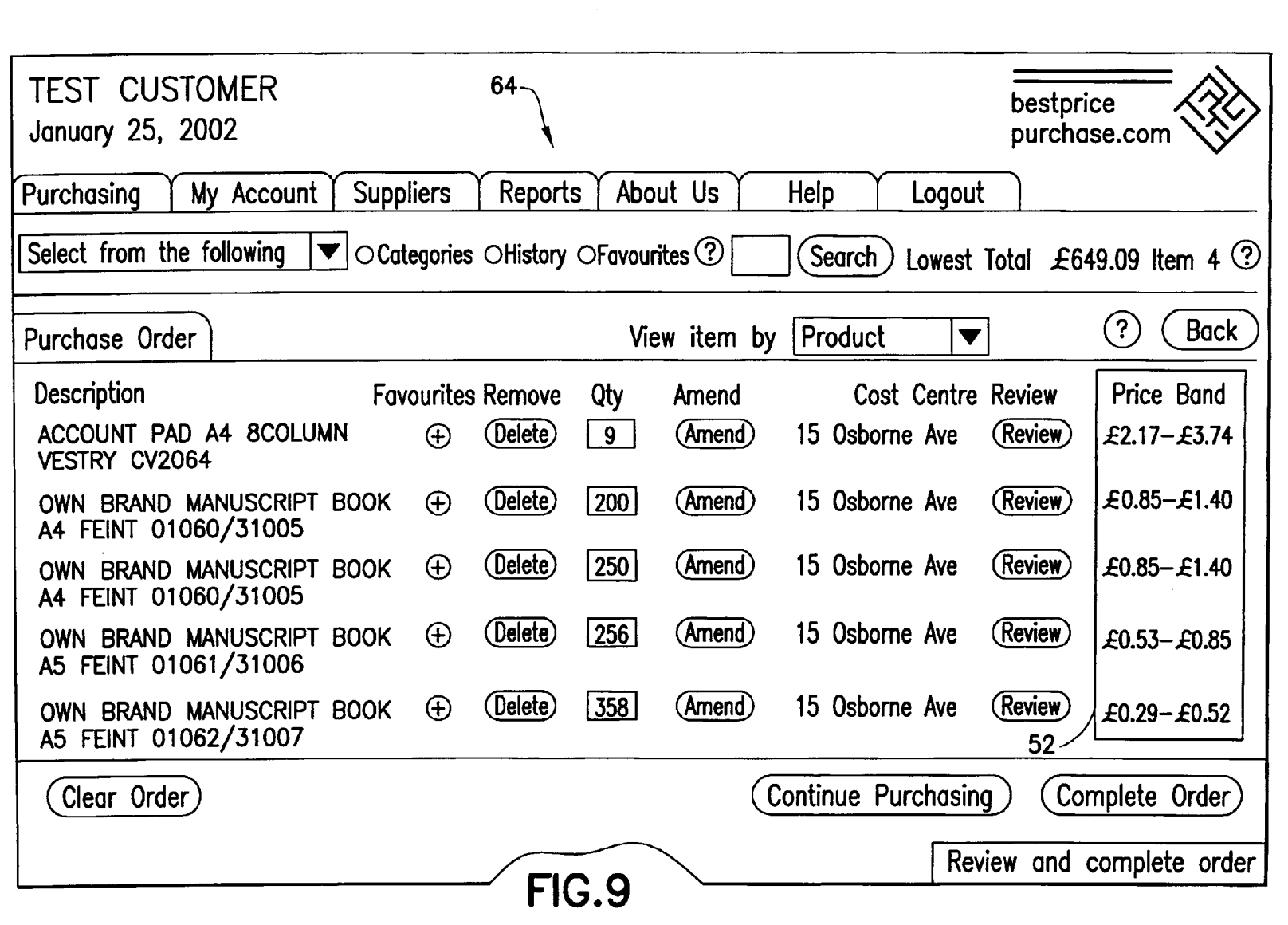

FIG. 9 shows a summary purchase session screen 64 identifying the details of the current purchase order for the customer. As shown therein, the sellables selected by the customer during the current session are listed, preferably in alphabetical order. For example, the quantity of each sellable is listed, and a price range 52 is further displayed. If the customer decides to procure more sellables during the current order session, then he or she preferably selects a link to continue purchasing. Alternatively, if the customer decides that he or she has completed the purchase order, he or she preferably selects a link to complete the purchase order. Moreover, the customer is preferably afforded the opportunity to add one or more sellables to a favorites list, amend the order, and review cost center information for the session.

Figure 10:
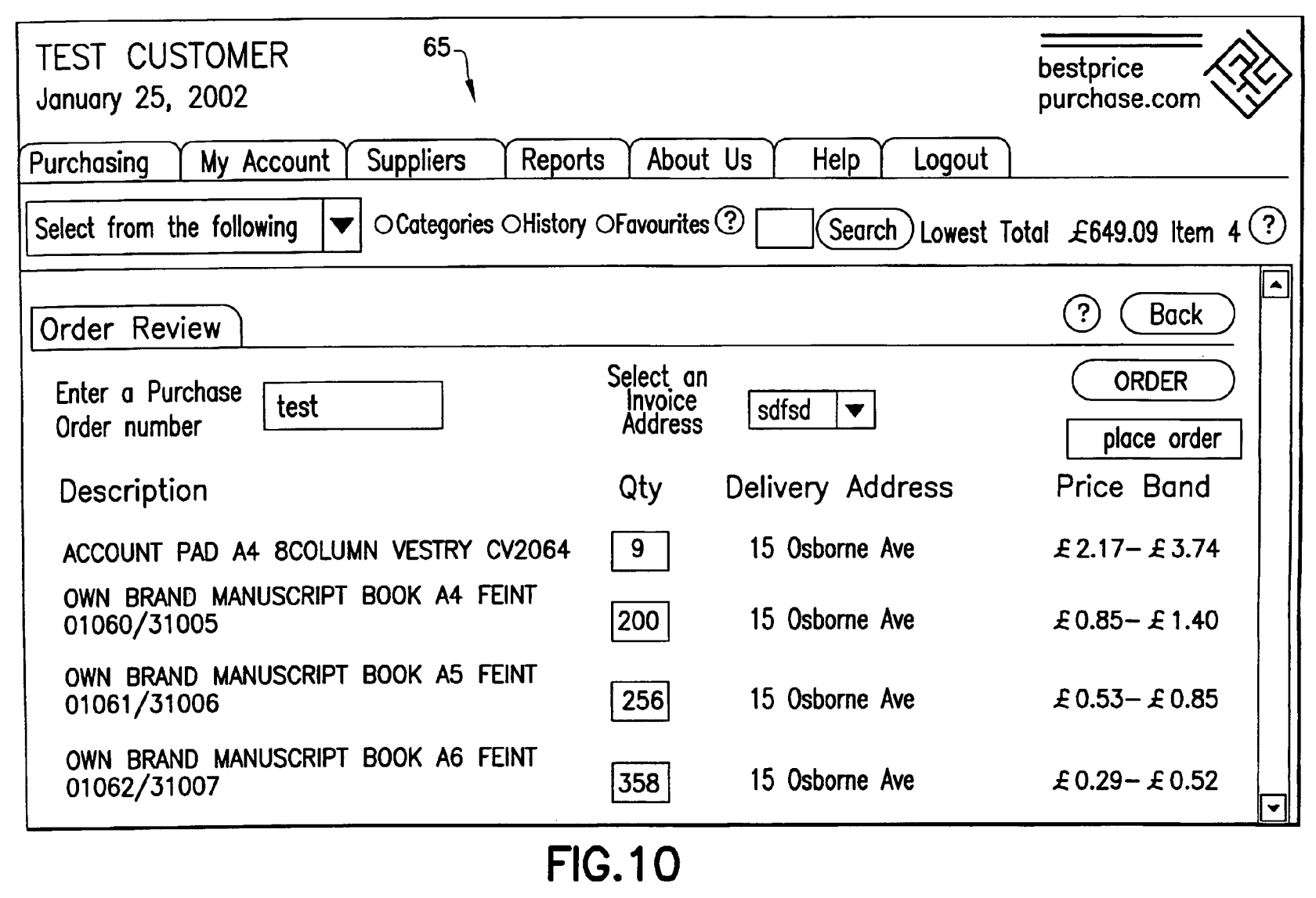

FIG. 10 illustrates an order review display screen 65 that is preferably presented to a user prior to placing an order. The description of the sellables selected for procurement, quantity thereof, delivery addresses, and a price range are preferably presented therein. Moreover, the customer is afforded an opportunity to assign a purchase order number to the order for future use. The customer is also able to select an invoice address for the order. When the customer is ready to place the order, he or she preferably selects a graphic control, for example a button labeled ORDER. In a preferred embodiment of the present invention, orders can be built up over time and placed at the customer's convenience, for example, by an administrative customer.

Figure 11:
FIG. 11 identifies an aggregate order display screen in accordance with the principles of the present invention.

FIG. 11 illustrates an aggregate order screen 66 that provides a listing, ordered by supplier, of the aggregate purchase price for the sellables selected during the order session. The automated procurement solutions system 10 preferably returns aggregate prices from a plurality of suppliers listed from the lowest aggregate price to the highest aggregate price. The system further prompts the customer to select one of the individual suppliers for the aggregate purchase order. The automated procurement solutions system 10 preferably calculates a percentage for each supplier that identifies the percentage of increase each supplier offers the aggregate order over the lowest price for the aggregate order.

Figure 12:
FIG. 12 shows an purchase order review display screen in accordance with the principles of the present invention.

FIG. 12 shows an purchase order review screen that is automatically generated by the automated procurement solutions system 10 after a customer selects one supplier from the list of suppliers (FIG. 11). After the customer has finished selecting sellables in a single ordering session, the automated procurement solutions system 10 preferably aggregates the purchase prices and displays the aggregate price of the order offered by each supplier in order list 68. Once a customer selects a single supplier for all of the sellables in a single order session, a purchase order is preferably generated by the system that includes the price of each individual sellable. The customer is afforded an opportunity to compare the prices in the purchase order with the prices shown in the price range list 52 to determine, approximately, where the price for each selected sellable falls within the range of prices. In the example shown in FIG. 12, a purchase order for a specific customer is displayed showing the sellables from a specific supplier, in the example shown in FIG. 12, "Universal." In a preferred embodiment, automated procurement solutions system 10 preferably does not offer any "cherry picking" functionality. Instead, customers are provided with the aggregate price for an order from a plurality of suppliers who can supply all of the sellables listed therein.

FIG. 13 identifies an order history display screen 70 that is presented to a customer who desires to review prior purchase orders. In the example shown in FIG. 13, the customer reviews the purchase order number, the date of the purchase, the purchaser, the category of sellables purchased, the suppliers, the number of sellables and the total amount of each order. The customer is preferably able to generate a new purchase order based upon on a collection of previously saved purchase orders and can thereafter make modifications thereto, or use a previous order in entirety.

In a preferred embodiment of the automated procurement solutions system 10, a customer's procurement habits are archived and analyzed during each order session. In this way, new orders that appear incongruent with previous orders are identified and an alert sent to the customer during the order session. Moreover, the automated procurement solutions system 10 reviews orders prior to being placed, and suggests sellables to the customer that are typically procured. By analyzing ordering habits, the automated procurement solutions system 10 can prevent ordering errors from occurring by highlighting unusual orders for the customer's review, or by suggesting orders not included in an order.

Also in a preferred embodiment, the automated procurement solutions system 10 preferably interfaces with databases, for example, accounting and inventory applications, and automatically transmits and receives information to and from such applications. In this way, data entry errors and redundant data entry requirements are prevented.

Moreover, suppliers preferably benefit by the present invention by reviewing statistics of orders placed in the system which are made to competitors. By reviewing statistical information, for example, the percentage of orders lost to competitors, suppliers can adjust their products and prices to remain competitive. This feature also benefits customers because competition between suppliers will serve to keep sellables affordable.

In a preferred embodiment of the present invention, customers receive a consolidation of invoices. After a customer places a plurality of orders with a plurality of suppliers, the customer preferably receives a single invoice that identifies the plurality of suppliers and sellables ordered therefrom in a meaningful way. By consolidating invoices, customers can keep orderly records of the sellables they procure, and further do not have to manage multiple invoices from multiple suppliers.

Additional functionality provided by the automated procurement solutions system 10 is now further described by way of example.

An insurance company needs to procure office supplies for a plurality of departments. A staff member of the insurance company is the user of the automated procurement solutions system 10 and accesses the homepage of the present invention by entering its corresponding URL in a web browser application. The user thereafter logs in by supplying her user ID and password. An automated procurement solutions system 10 recognizes that the user is authorized to use the system 10 to procure sellables and presents a select category order screen 42. The user office products from the list of categories of sellables provided by the system. Thereafter, the user selects desktop accessories from the category of office goods, and identifies a quantity of letter trays, a number of desk lamps, and writing blotters. During selection of these sellables, the automated procurement solutions system 10 displays a price range 52 for the user's review. Adjacent to the letter tray choice, the user selects a check box indicating that multiple cost centers are to receive the letter trays. The user clicks on a graphic control, for example a windowed button labeled "next" and the automated procurement solutions system 10 preferably displays a multiple cost center data entry form enabling the user to identify cost centers that are to receive the letter trays.

After identifying the quantity of letter trays each cost center will receive, the user preferably continues her ordering session by adding more sellables to the purchase order form. After the user has completed selecting the sellables, the user preferably clicks on a graphic control, for example, a windowed button labeled "complete order" to submit the order and cause the price optimization module 34 to list prices of the order for a plurality of suppliers. The automated procurement solutions system 10 displays each supplier's price for the aggregate order, and orders the list by the prices offered by each supplier.

After reviewing the suppliers' prices for the aggregate order, the user decides to select the supplier that offers the lowest price for the order by selecting a graphic control, for example a windowed button labeled "order." The user is provided with a terms and conditions display screen that the user can accept or reject depending upon whether the terms of the order are acceptable or not. Thereafter, the user is presented with an invoice screen which identifies the quantity and details of all of the sellables the customer selected during the ordering process. Included in the invoice display screen is the unit price of each good and/or service, the net price of all of the sellables, and a gross price therefor. The user can assess the price of each sellable in relation to the price range 52 she reviewed while selecting sellables.

The user thereafter logs out of the system by selecting a graphic control, for example a windowed button labeled "log out" and the user electronically pays for the sellables in the purchase order.

A discussion directed to other features and advantages of the present invention directed to suppliers will now take place.

As noted above, the present invention preferably provides suppliers of sellables with strategic advantages in the marketplace. Specifically, operational expenses are significantly reduced by the present invention because, for example, order processing, marketing procedures, inventory control, invoicing, payment procedures, and access to a large customer based are either provided by, or assisted by, the present invention. These features enable suppliers to sell their sellables at competitive prices and to maintain high profit margins.

Moreover, the automated procurement solutions system 10 informs customers of supplier-related information. For example, the system informs customers of supplier inventory stock levels, new sellables information, special promotions and sellable tracking information. By providing this information, the suppliers can invest more time in strategic business practices and increase their profit margins.

The automated procurement solutions system 10 also provides significant management functionality for suppliers. As noted above, the system preferably checks inventory stock levels, finds locations in warehouses for receipt of inventory stock, and compares inventory that is retrieved within a warehouse with on-line purchase orders in order to ensure accuracy. Moreover, the system preferably prompts suppliers to reorder inventory after procurement, and, further, monitors procurement habits of customers and provides patterns of purchasing to enable a supplier to develop business strategies.

During the initial registration of a customer, the automated procurement solutions system 10 preferably receives information regarding the customer's credit. For example, the system identifies a maximum amount that a customer is willing to spend in any single purchase order. Alternatively, the system analyzes a customer's credit history and assigns a maximum amount that the customer is able to afford during a single purchase order. During the ordering process, should the customer spend nearly the maximum amount identified in the registration process, the system preferably prompts the user thereof. This feature of the present invention provides an advantage to suppliers because customers precluded from entering into purchases that they are unable to afford.

The automated procurement solutions system 10 preferably provides reports that are available to suppliers. In operation, the automated procurement solutions system 10 generates reports in response to selections made by users of the system, for example, via links and other graphic display screen controls (i.e., buttons, drop-down lists, and the like). The reports that are available include, for example, listings of sellables that are purchased, numbers of orders lost to competing suppliers, information directed to delivery of sellables, comparisons of suppliers with regard to prices of sellables, and reports detailing customers that purchase sellables. Suppliers are preferably able to review the reports on their displays 30, or, alternatively, suppliers can print the reports on paper. In the preferred embodiment, a plurality of pre-designed data reports are available for suppliers and custom reports can be developed in response to suppliers' requests therefor. Other examples of reports available via system 10 include summaries of invoicing, summaries of orders and cost center summaries.

In addition to reports, the automated procurement solutions system 10 preferably provides other feedback mechanisms to keep suppliers. Suppliers use feedback to be informed of supplier performance, customer satisfaction, and other supplier business-related information. For example, as part of the procurement process, customers fill in questionnaires that are directed to supplier performance. The suppliers electronically receive customer responses to the questionnaires which gives suppliers the necessary feedback to improve their business models.

A discussion directed to other features and advantages of the present invention to customers will now take place.

As noted above, the automated procurement solutions system 10 provides customers with certainty that the customer is paying the lowest price for the customer's aggregate order of sellables. The present invention preferably provides the customer with access to a plurality of good categories, and eliminates the need to compare prices offered for sellables by a plurality of suppliers. The customer is assured of the lowest aggregate cost for sellables, and has access to a large supplier-base that grows each time a new supplier participates in the system.

During the procurement process, customers purchasing sellables via the automated procurement solutions system 10 are continually informed, for example, of availability, price, delivery schedule and tracking information. The customer preferably relies upon this information to ascertain, for example, the good/service arrival dates, when an unavailable good/service will be available, etc.

The automated procurement solutions system 10 provides on-line assistance for customers during the procurement process. For example, if a customer routinely orders a good and does not order the good in a given ordering session, then the system preferably prompts the user to order the good. Alternatively, the system can analyze previous purchases and suggest that certain sellables have already been purchased thereby preventing the customer from making a redundant purchase. Further, if a customer over-extends his/her credit limit, then the system preferably prompts him/her of that limit, and prevents the customer from spending beyond his/her means.

In the preferred embodiment, the automated procurement solutions system 10 further provides customers with an on-line consultant feature. Frequently, customers are not proficient in procuring sellables they require and, typically, either overspend or do not acquire what they need. The on-line consultancy feature preferably assists customers with purchase negotiations during acquisition of sellables with which the customer is not familiar. The on-line consultancy feature also introduces customers to suppliers that can provide specialty sellables and/or provide advice. Further, if an order is made which is incongruent with the customer's ordering history, then the on-line consultant preferably alerts the user that the order may have been made in error. The on-line consultancy feature of the automated procurement solutions system 10 preferably provides expertise to prevent unnecessary procurement of sellables, to negotiate for the customer for price, service and terms and to prompt customers to procure sellables to minimize the cost of procurement for customers.

The features of the present invention effectively provide for increased efficiency for buying and selling sellables in a plurality of industries. By monitoring activity of the participants of the system, customers and suppliers are provided with an efficient mechanism.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A system for providing at least two sellables to a customer, said at least two sellables offered by a plurality of suppliers, said system comprising:
    computer code operating on at least one host system computing device connected to a communication network to which said plurality of suppliers and said customer connect;
    computer code operating on said at least one host system computing device providing a request module that receives a request for said at least two sellables from a customer;
    computer code operating on said at least one host system computing device providing a price receiving module that receives a respective price for at least each of said at least two sellables from each of said plurality of suppliers prior to receiving said request for said at least two sellables;
    computer code operating on said at least one host system computing device that electronically stores said respective price from each of said plurality of suppliers in a database, said database being operably connected to said at least one host system computing device;
    computer code operating on said at least one host system computing device providing an aggregating module that aggregates said respective price for each of said at least two sellables to provide a final respective aggregate price for said at least two sellables from the price receiving module; and
    computer code operating on said at least one host system computing device providing a display module that displays each said final respective aggregate price for each respective one of said plurality of suppliers.

2. The system of claim 1, wherein said display module sorts said aggregate of prices in ascending order.

3. The system of claim 1, further comprising computer code operating on said at least one host system computing device providing a price selection module receiving a selection of one of said aggregate of prices from said customer, said selection representing a commitment by said customer to purchase said at least two sellables represented by said one of said aggregate of prices received from one of said plurality of suppliers.

4. The system of claim 3, wherein said display module displays the price for each respective one of said at least two sellables after receiving said selection by from said customer.

5. The system of claim 1, further comprising computer code operating on said at least one host system computing device providing a customer registration module receiving customer registration information from said customer, said customer registration information representing financial credit of said customer.

6. The system of claim 5, further comprising computer code operating on said at least one host system computing device providing a customer categorization module categorizing said customer as at least one of administrative customer and staff customer; wherein said administrative customer is afforded at least all of the same authorization as said staff customer.

7. The system of claim 6, wherein said administrative customer is authorized to perform at least one of: restricting choices of said staff customer of said at least two sellables, canceling a request by said staff customer for said at least two sellables, modifying a request by said staff customer for said at least two sellables, and transmitting a request for at least two sellables.

8. The system of claim 5, further comprising computer code operating on said at least one host system computing device providing a credit comparison module performing a comparison of said financial credit with said selected aggregate of prices, and communicating said comparison to at least one of said one of said plurality of suppliers and said customer.

9. The system of claim 8, wherein said customer cancels said request for said sellables in response to said comparison.

10. The system of claim 1, further comprising computer code operating on said at least one host system computing device providing a supplier registration module receiving supplier registration information from each of said plurality of suppliers, said supplier registration information representing at least one of:
categories of said at least two sellables;
descriptions of said at least two sellables;
prices of said at least two sellables;
availability of said at least two sellables; and
descriptions of delivery of said at least two sellables.

11. The system of claim 10, further comprising computer code operating on said at least one host system computing device providing a supplier sellable comparison module comparing said supplier registration information with said at least two sellables represented by said selected aggregate of prices, and communicating said comparison to at least one of said customer and said one of said plurality of suppliers.

12. The system of claim 11, wherein supplier sellable comparison module receives a cancellation from said customer of said request for said sellables in response to said comparison.

13. The system of claim 1, further comprising computer code operating on said at least one host system computing device providing an archive module storing said plurality of requests for said at least two sellables from said customer, and using said stored requests for future procurement of said at least two sellables.

14. The system of claim 13, wherein said archive module further generates a history of said requests for said at least two sellables made by said customer, and displaying said history to said customer.

15. The system of claim 13, wherein said archive module further provides a history of said requests for said at least two sellables offered by said supplier, and displaying said history to said supplier.

16. The system of claim 1, further comprising computer code operating on said at least one host system computing device providing a price range module displaying a range of prices for each of said at least two sellables, said range of prices including a lowest price and a highest price for each of said at least two sellables offered by said plurality of suppliers.

17. The system of claim 1, further comprising computer code operating on said at least one host system computing device providing a cost center module receiving at least one delivery location where at least one of said at least two sellables are to be delivered.

18. The system of claim 1, further comprising computer code operating on said at least one host system computing device providing a purchase order module, said purchase order module generating an invoice for said at least two sellables selected by said customer, and communicating said invoice to at least one of said customer and said one of said plurality of said suppliers.

19. The method of claim 18, wherein said invoice module consolidates a plurality of requests placed by at least one customer for said at least two sellables with at least one supplier into a single invoice.

20. The system of claim 1, wherein said customer modifies said request for said at least two sellables, said modification of said request comprising changes to at least one of said at least two sellables.

21. The system of claim 1, further comprising a search control to locate at least one of said two sellables, said search control automatically provided when said at least one of said two sellables cannot be located.

22. The system of claim 1, further comprising computer code operating on said at least one host system computing device providing a replacement module, said replacement module providing at least one alternative sellable when at least one of said at least two sellables cannot be located.

23. The system of claim 1, further comprising computer code operating on said at least one host system computing device providing a procuring habits module, said procuring habits module analyzing procurement habits and providing at least one suggestion to said customer.

24. The system of claim 23, wherein said at least one suggestion includes at least one of changing said request for said at least two sellables, adding a request for said at least two sellables, and removing said request for said at least two sellables.

25. The system of claim 1, wherein each of said plurality of suppliers offers the same sellables.

26. A method for providing at least two sellables to a customer, said at least two sellables offered by a plurality of suppliers, said method comprising:
providing by at least one host system an electronic site connected to a communication network to which said plurality of suppliers and said customer connect;
electronically receiving a request for said at least two sellables from said customer on said electronic site;
electronically receiving a respective price for at least each of said at least two sellables from each of said plurality of suppliers on said electronic site prior to receiving said request for said at least two sellables;
electronically storing said respective price from each of said plurality of suppliers in a database, said database being operably connected to said at least one host system;
aggregating said previously received prices from each of said plurality of suppliers for said at least two sellables to provide a final respective aggregate price for said at least two sellables from each of said plurality of suppliers;
electronically providing said final respective aggregate price for each of said plurality of suppliers; and receiving a selection of one of said final respective aggregate price from said customer for one of said plurality of suppliers, said step of receiving said selection representing a commitment from said customer to purchase said at least two sellables at said final respective aggregate price from said selected one of said plurality of suppliers.

27. The method of claim 26, wherein said step of receiving a request for said at least two sellables comprises at least one of:
   electronically providing a category for each of said at least two sellables;
   electronically providing a description of each of said at least two sellables;
   electronically receiving a selection of said description of each of said at least two sellables.

28. The method of claim 27, further comprising electronically receiving customer registration information, said customer registration information representing financial credit of said customer.

29. The method of claim 28, further comprising performing a comparison of said financial credit with said selected aggregate of prices, and communicating said comparison to said one of said plurality of suppliers and to said customer.

30. The method of claim 29, further comprising stopping said method of providing at least two sellables to said customer in response to said comparison.

31. The method of claim 26, further comprising electronically receiving supplier registration information from each of said plurality of suppliers, said supplier registration information representing at least one of:
   categories of said at least two sellables;
   descriptions of said at least two sellables;
   prices of said at least two sellables;
   availability of said at least two sellables; and
   descriptions of delivery of said at least two sellables.

32. The method of claim 31, further comprising performing a comparison of said supplier registration information with said at least two sellables represented by said selected aggregate of prices, and communicating said comparison to said customer and said one of said plurality of suppliers.

33. The method of claim 32, further comprising stopping said method of providing at least of goods and services to said customer in response to said comparison.

34. The method of claim 26, further comprising offering at least one alternative to said at least one of said at least two sellables when said at least one of said at least two sellables cannot be located.

35. The method of claim 26, further comprising storing said requests for said at least two sellables from said customer, and using said stored requests for future procurement of said at least two sellables.

36. The method of claim 26, further comprising storing a history of all previous requests for said at least two sellables made by said customer, and displaying said history to said customer.

37. The method of claim 26, further comprising displaying a range of prices for each of said at least two sellables, said range of prices including a lowest price and a highest price for each of said at least two sellables offered by said plurality of suppliers.

38. The method of claim 26, further comprising receiving at least one delivery location where said at least two sellables are delivered.

39. The method of claim 26, further comprising generating an invoice for said at least two sellables selected by said customer, and communicating said invoice to said customer and said one of said plurality of suppliers.

40. The method of claim 26, further comprising receiving a modification of said request for said at least two sellables, said modification of said request comprising changes to at least one of said at least two sellables.

41. The method of claim 26, wherein each of said plurality of suppliers offers the same sellables.

42. A system for providing at least two sellables to a customer, said at least two sellables offered by a plurality of suppliers, said system comprising:
   at least one host system computing device connected to a communication network to which said plurality of suppliers and said customer connect;
   computer code operating on said at least one host system computing device providing a price quote module receiving from a plurality of suppliers at least identifiers representing a plurality of sellables, and a respective price for each of said of at least two sellables from each respective one of said plurality of suppliers prior to receiving a request for said at least two sellables;
   a price database operably connected to said at least one host system computing device that stores said respective price for each of said of at least two sellables from each respective one of said plurality of suppliers, said price database providing at least said identifiers and said respective prices;
   computer code operating on said at least one host system computing device providing a request module receiving said request for at least two sellables from a customer;
   computer code operating on said at least one host system computing device providing a matching module matching said respective price for said each of said at least two sellables in said price database;
   computer code operating on said at least one host system computing device providing a combining module combining said matched respective prices for said each of said at least two sellables to provide a final respective combined price for said at least two sellables; and
   computer code operating on said at least one host system computing device providing a display module displaying said final respective combined prices received from said combining module.

43. A system for providing at least two sellables to a customer, said at least two sellables offered by a plurality of suppliers, said system comprising:
   at least one host system computing device connected to a communication network to which said plurality of suppliers and said customer connect;
   computer code operating on said at least one host system computing device providing a request module receiving a request for said at least two sellables from at least one customer;
   computer code operating on said at least one host system computing device providing a price receiving module receiving a respective price for at least each of said at least two sellables from each of said at least two suppliers prior to receiving said request for said at least two sellables;
   computer code operating on said at least one host system computing device electronically storing said respective price from each of said plurality of suppliers in a database, said database being operably connected to said at least one host system computing device;

computer code operating on said at least one host system computing device providing an aggregating module aggregating said respective price for each of said at least two sellables from each respective one of said at least two suppliers to provide a final respective aggregate price for said at least two sellables from each of said plurality of suppliers;

computer code operating on said at least one host system computing device providing a display module displaying each said final respective aggregate price for each respective one of said at least two suppliers; and computer code operating on said at least one host system computing device providing a price range module displaying a range of prices for final respective aggregate price of said at least two sellables, said range of prices including a lowest price and a highest price for said at least two sellables offered by each of said at least two suppliers.

44. The system of claim 43, wherein each of said at least two suppliers offers the same kind of at least two sellables.

* * * * *